United States Patent
Mack et al.

(10) Patent No.: US 8,187,128 B2
(45) Date of Patent: May 29, 2012

(54) TENSIONING DEVICE

(75) Inventors: Stefan Mack, Erlangen (DE); Matthias Schmidl, Eckental (DE); Rainer Pflug, Heilsbronn (DE)

(73) Assignee: Schaeffler KG, Herzogenaurach (DE)

( * ) Notice: Subject to any disclaimer, the term of this patent is extended or adjusted under 35 U.S.C. 154(b) by 621 days.

(21) Appl. No.: 12/444,207

(22) PCT Filed: Aug. 16, 2007

(86) PCT No.: PCT/EP2007/058521
§ 371 (c)(1),
(2), (4) Date: Apr. 3, 2009

(87) PCT Pub. No.: WO2008/040594
PCT Pub. Date: Apr. 10, 2008

(65) Prior Publication Data
US 2010/0048336 A1    Feb. 25, 2010

(30) Foreign Application Priority Data
Oct. 5, 2006  (DE) .......................... 10 2006 047 095

(51) Int. Cl.
*F16H 7/12* (2006.01)
(52) U.S. Cl. ........................................ 474/138
(58) Field of Classification Search .................. 474/133, 474/135, 101, 109, 111, 112, 138
See application file for complete search history.

(56) References Cited

U.S. PATENT DOCUMENTS

| | | | |
|---|---|---|---|
| 4,583,962 A * | 4/1986 | Bytzek et al. ................. | 474/133 |
| 4,596,538 A * | 6/1986 | Henderson ..................... | 474/135 |
| 4,698,049 A * | 10/1987 | Bytzek et al. ................. | 474/135 |
| 4,832,666 A * | 5/1989 | Henderson ..................... | 474/135 |
| 4,886,483 A * | 12/1989 | Henderson ..................... | 474/135 |
| 4,902,267 A * | 2/1990 | Henderson ..................... | 474/133 |
| 4,938,734 A * | 7/1990 | Green et al. ................... | 474/135 |
| 4,950,207 A * | 8/1990 | Henderson ..................... | 474/133 |
| 5,017,181 A * | 5/1991 | Henderson ..................... | 474/133 |
| 5,030,172 A | 7/1991 | Green | |
| 5,057,059 A * | 10/1991 | Sidwell et al. ................ | 474/135 |
| 5,443,424 A | 8/1995 | Henderson | |
| 5,449,328 A * | 9/1995 | Schmidt et al. ............... | 474/135 |
| 5,718,649 A * | 2/1998 | Hong et al. .................... | 474/91 |
| 5,795,257 A * | 8/1998 | Giese et al. .................... | 474/109 |
| 7,144,344 B2 * | 12/2006 | Konanz ......................... | 474/117 |
| 7,229,374 B2 * | 6/2007 | Meckstroth et al. ........... | 474/133 |
| 7,850,561 B2 * | 12/2010 | Wilhelm et al. ............... | 474/135 |
| 7,993,226 B2 * | 8/2011 | Mack et al. .................... | 474/135 |
| 8,038,555 B2 * | 10/2011 | Pendergrass et al. .......... | 474/135 |
| 2003/0022746 A1 * | 1/2003 | Ayukawa ....................... | 474/135 |
| 2003/0078124 A1 * | 4/2003 | Serkh ............................. | 474/135 |
| 2005/0181902 A1 * | 8/2005 | Konanz ......................... | 474/135 |
| 2008/0125260 A1 * | 5/2008 | Wilhelm et al. ............... | 474/135 |
| 2008/0220919 A1 * | 9/2008 | Antchak et al. ............... | 474/135 |

FOREIGN PATENT DOCUMENTS

DE          35 90 411          9/1986

(Continued)

Primary Examiner — Thomas B Will
Assistant Examiner — Joan Misa
(74) Attorney, Agent, or Firm — Fitzpatrick, Cella, Harper & Scinto (57) ABSTRACT

The invention relates to a clamping device comprising a pivoting arm on which a clamping roll is rotatably arranged. In order to damp pivoting movements of the pivoting arm, a damping device is provided in the region of a pivoting axis X. Furthermore, the pivoting arm is supported by a tension spring device which ensures a frictional arrangement of the clamping roll on a traction mechanism, in the assembled state.

15 Claims, 8 Drawing Sheets

FOREIGN PATENT DOCUMENTS

| | | |
|---|---|---|
| DE | 43 00 178 | 4/1994 |
| DE | 43 45 150 | 5/1995 |
| DE | 196 03 558 A | 6/1997 |
| DE | 102 48 352 | 4/2004 |
| DE | 10 2004 046 092 | 3/2006 |
| EP | 0 364 277 | 4/1990 |
| WO | 03/087625 | 10/2003 |

* cited by examiner

TENSIONING DEVICE

This application is a 371 of PCT/EP2007/058521 filed Aug. 16, 2007, which in turn claims the priority of DE 10 2006 047 095.8 filed Oct. 05, 2006, the priority of both applications is hereby claimed and both applications are incorporated by reference herein.

FIELD OF THE INVENTION

The invention concerns a tensioning device for a traction drive, particularly a belt drive installed in an internal combustion engine for driving components of the engine or attached auxiliary units such as, for example, generators, water pumps, air conditioner compressors of comparable units.

A belt tensioning device known from DE 35 46 901 C2 comprises a fixing block and a pivoted arm mounting for pivoting thereon. The belt tensioning device further comprises a torsion spring through which a torque operative between the fixing block and the pivoted arm is produced. This torque enables a tension roller mounted on the pivoted arm to be urged against a strand of the belt, typically an idle strand of the belt drive, and thus provides sufficient tightening for maintaining the frictional engagement of the pulleys of the belt drive. In addition, a braking device is also operative between the fixing block and the pivoted arm for braking the movement of the pivoted arm by means of coulomb friction and providing a damping of the belt vibrations.

DE 101 31 916 A1 likewise discloses a tensioning device for traction elements, particularly a belt tensioning device. This tensioning device likewise comprises a fixing structure and a pivoted arm that is mounted for pivoting thereon and comprises a tension roller. The pivoting motion between the pivoted arm and the base structure is damped through a bushing that comprises friction contact surfaces and is inserted into the interior of a coil spring functioning as a return spring.

Further belt tensioning devices comprising a spring-loaded pivoted arm whose pivoting motion is damped by braking devices are known from EP 0 967 412 A2, DE 100 63 638 A1, EP 0 866 240 B1, EP 0 450 620 B1 and DE 10 2004 047 422 A1.

A further tensioning device known from WO 02/068841 comprises, similar to the aforesaid tensioning devices, a pivoted arm that is mounted for pivoting on a bearing peg. A cover element comprising a Belleville washer and a friction disk is fixed on the bearing peg, said friction disk being seated on a front end of the pivoted arm that surrounds the bearing peg.

OBJECT OF THE INVENTION

The object of the invention is to provide a tensioning device that has an advantageous structure from the fabrication and constructional point of view and a high degree of robustness as well as an advantageous mechanical behavior in operation.

Inventive Solution

The invention achieves the aforesaid object through a tensioning device comprising:
a bearing peg,
a pivoted arm mounted for pivoting on the bearing peg, and
a damping device for generating a frictional force that damps the pivoting motion of the pivoted arm about an axis of pivot defined by the bearing peg,
said damping device comprising a friction surface member forming a friction surface that is seated on a counter-friction surface and produces a frictional force,
wherein said damping device is characterized in that
the damping device comprises an entraining device and
a guide member engaged with the entraining device and supporting or forming the friction surface member,
the guide member being guided on the bearing peg such that the guide member can be axially displaced in direction of the axis of pivot defined by the bearing peg, and
the guide member provides a peripheral wall that is engaged with the entraining device for axial displacement for introducing into the bearing peg a friction torque acting on the friction surface member.

Thus, advantageously, a tensioning device for a traction drive is created that can be realized on the whole as a relatively compact sub-assembly and possesses an advantageous mechanical behavior in operation that can be reliably guaranteed over a long period of operation. Advantageously, by a proper setting of the spring force exerted by the spring device on the guide device, the damping characteristic of the tensioning device can be appropriately defined. It is further possible to influence the braking and damping behavior of the tensioning device by an adequate choice of the material used to make the friction member.

According to a particularly advantageous embodiment of the invention, the guide member is configured as a cup structure comprising a bottom opening that fringes the bearing peg. This bottom opening is preferably configured so as to define a peripheral wall that engages an outer peripheral surface of the bearing peg, so that the cup structure, although axially displaceable, cannot rotate relative to the bearing peg. This special coupling of the cup structure to the bearing peg can be realized particularly by configuring on the bearing peg an engagement geometry, for example in the form of a peripheral knurling, that cuts automatically into the peripheral wall of the cup structure. Through this additional rotational coupling of the cup structure to the bearing peg, the load on the engagement sections configured on the cup structure, which are required for transmission of the friction torque, can be reduced on the whole because the load torque is distributed over a plurality of engagement structures.

According to a further particularly advantageous embodiment of the invention, the friction surface member constitutes a direct integral part of the cup structure. This cup structure can be configured, in particular, as a plastic injection molded part. The plastic material is preferably a plastic having an adequate bearing capacity from the mechanical-structural point of view and an adequate thermal resistance. The plastic material can be equipped with filling materials, particularly ceramic fillers. In particular, it is also possible to make the friction surface member or the entire cup structure of a plastic material based on Teflon. The guide device can also be made as an insert molding component. The geared sections can be formed by an annular body made by deep drawing. The sections forming the friction member can be injection-formed thereon.

According to a particularly preferred embodiment of the invention, the entraining device in engagement with aforesaid peripheral wall of the cup structure is configured as a disk element. This disk element can comprise a central bore that is seated on an end portion of the bearing peg and rigidly connected to this, for example, by plastic deformation. On the outer periphery of the disk element is preferably formed an axial gearing that meshes with an inner peripheral surface of the cup structure and thus enables a take-up of the friction torque introduced into the cup structure. Alternative to the configuration of the entraining device as a disk element, or even in combination with this, it is also possible to configure the entraining device as a bell-shaped element engaging over the cup structure. This embodiment enables the friction torque applied to the cup structure to be introduced into the bell-shaped element through a gearing provided on the outer peripheral surface of the cup structure. The bell-shaped element, again, similar to the aforesaid disk element, can also be rigidly connected to the bearing peg, particularly by welding, stamping or pressing, or it can be coupled thereto by positive or force engagement.

Preferably, an axial gearing is formed directly into an inner surface of the peripheral wall of the cup element and meshes with a complementary outer gearing of the disk element. The gearing geometry is preferably selected so as to enable a relatively easy-running axial displacement of the cup element relative to the disk element but not permit any substantial relative rotation between these two components. Alternatively to the aforesaid configuration of the gearing between the entraining device and the cup structure as a purely axial gearing, it is also possible to configure said gearing as a helical gearing. This permits a generation of friction torques of different magnitude in the two directions of pivot of the tensioning lever because, through this helical gearing, the pressing force of the friction member against a corresponding counter-friction surface is increased or decreased as a function of the direction of pivot.

According to another feature of the invention, the friction surface member is urged against said counter-friction surface by a spring device. This spring device can particularly be configured as an ondular washer and seated in an intermediate space formed between an underside of the disk element und an opposing inner surface of the cup element. The cup element can be configured so as to define a spring seat structure suitable for a reliable positioning of this ondular washer. The ondular washer can be seated directly on an outer surface of the cup element. Preferably, however, a shim can be inserted between the cup element and the ondular washer to reduce the mechanical loading of the cup structure in the region of the contact zones of the spring element.

The aforesaid counter-friction surface in frictional contact with the friction surface member is preferably formed directly by an end surface section of the pivoted arm that surrounds the bearing peg. It is possible to form this counter-friction surface in the form of a circumferential groove preferably having a substantially V-shaped cross-section. This measure permits the friction surface member to be configured as a tapered ring through which high friction torques can be transmitted already at low axial forces. With this configuration of the friction surface member as a tapered ring, an advantageous centering und radial guidance of the cup element is achieved on the whole. Moreover, such a friction surface member with its relatively large material volume guarantees a particularly long operating life of the tensioning device. The pivoted arm of the tensioning device is seated preferably through an interposed bearing structure, particularly at least one sliding bearing bushing, on the bearing peg. The bearing peg is preferably fixed on a base plate. Through this base plate, preferably, the axial position of the pivoted arm is also fixed. It is possible to arrange, in a displacement gap defined between an end surface of the pivoted arm and the base plate, a disk element that enables an adequately smooth and low-noise movement of the pivoted arm relative to the base plate. This disk element, too, can be made of a material whose friction properties contribute to the achievement of the required damping effect of the tensioning device. In particular, it is possible according to the inventive arrangement of the pivoted arm on the bearing peg, to guide the bearing peg between two axially pre-loaded friction surface structures and thus subject it to an appropriate damping torque.

Further details and features of the invention result from the following description made with reference to the appended drawing.

DETAILED DESCRIPTION OF THE DRAWING

Figure 1:
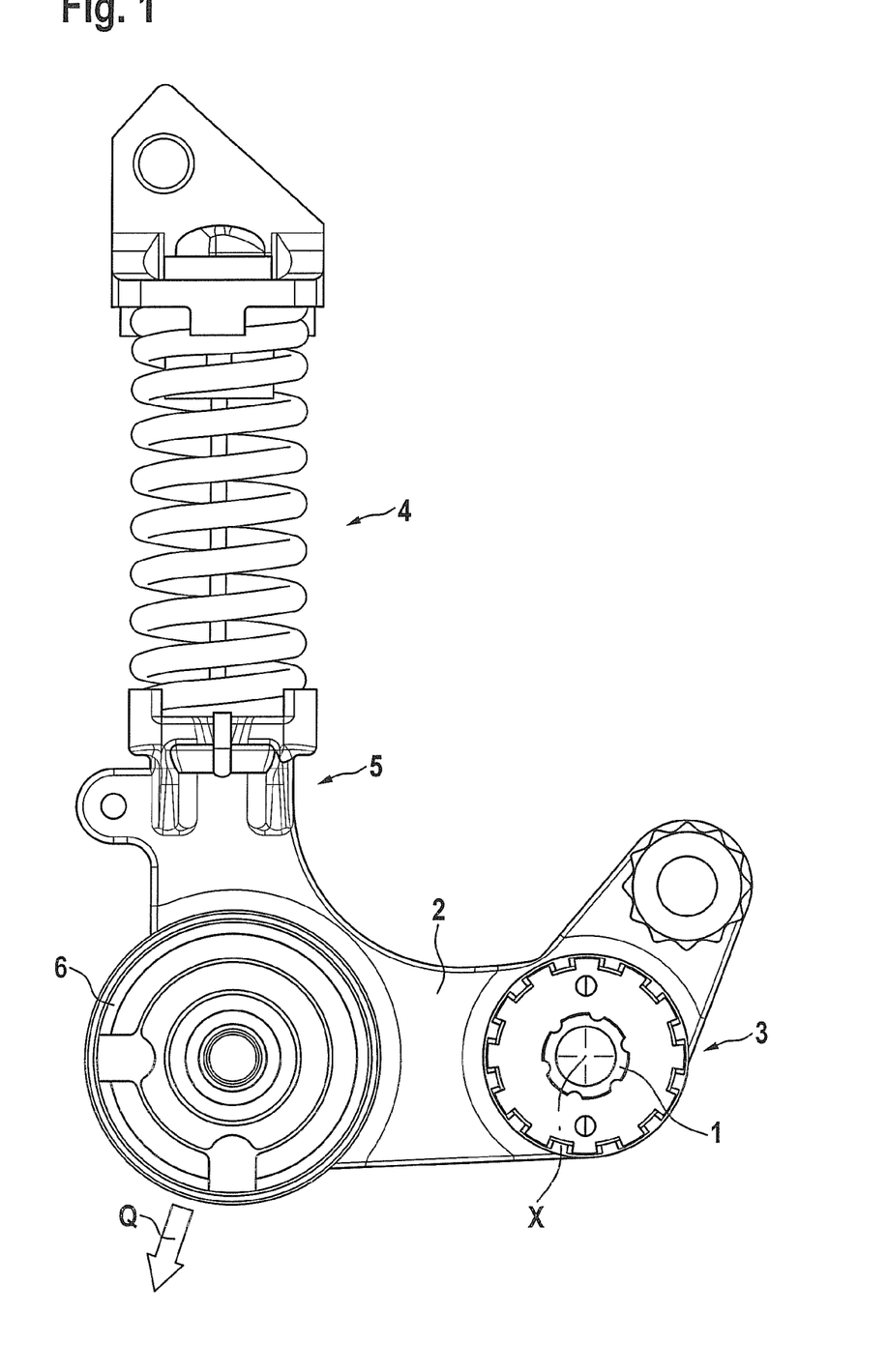
FIG. 1 is a top view of a tensioning device of the invention including a tensioning spring device for generating a tension force.

The tensioning device illustrated in FIG. 1 serves to introduce a transverse force Q into a traction drive, particularly a belt drive. The tensioning device comprises a bearing peg 1 and a pivoted arm 2 mounted for pivoting on the bearing peg 1. The tensioning device further comprises a damping device 3 for generating a friction or damping torque through which the pivoting motion of the pivoted arm 2 about an axis of pivot X defined through the bearing peg 1 is damped. The damping device whose build-up will be explained more closely with reference to the following figures, comprises a friction surface member 9 (FIG. 2) that defines a friction surface that is seated on a counter-friction surface and serves to provide a friction force.

The transverse force Q provided for tensioning the belt is generated in this example of embodiment through a tensioning spring device 4 that is supported on a tensioning spring support section 5 provided on the pivoted arm 2. Alternatively to this manner of providing the tensioning force through a tensioning spring device 4 which acts from the outside on the pivoted arm 2, it is also possible to provide the pivoted arm 2 with forces or a torque through other measures for, urging, in the end, the tension roller 6 mounted on the pivoted arm 2 against a traction element.

The tensioning device illustrated here is particularly suitable for installation in an internal combustion engine for tightening a flat belt, particularly a poly-V-belt, for driving auxiliary units.

Figure 2:
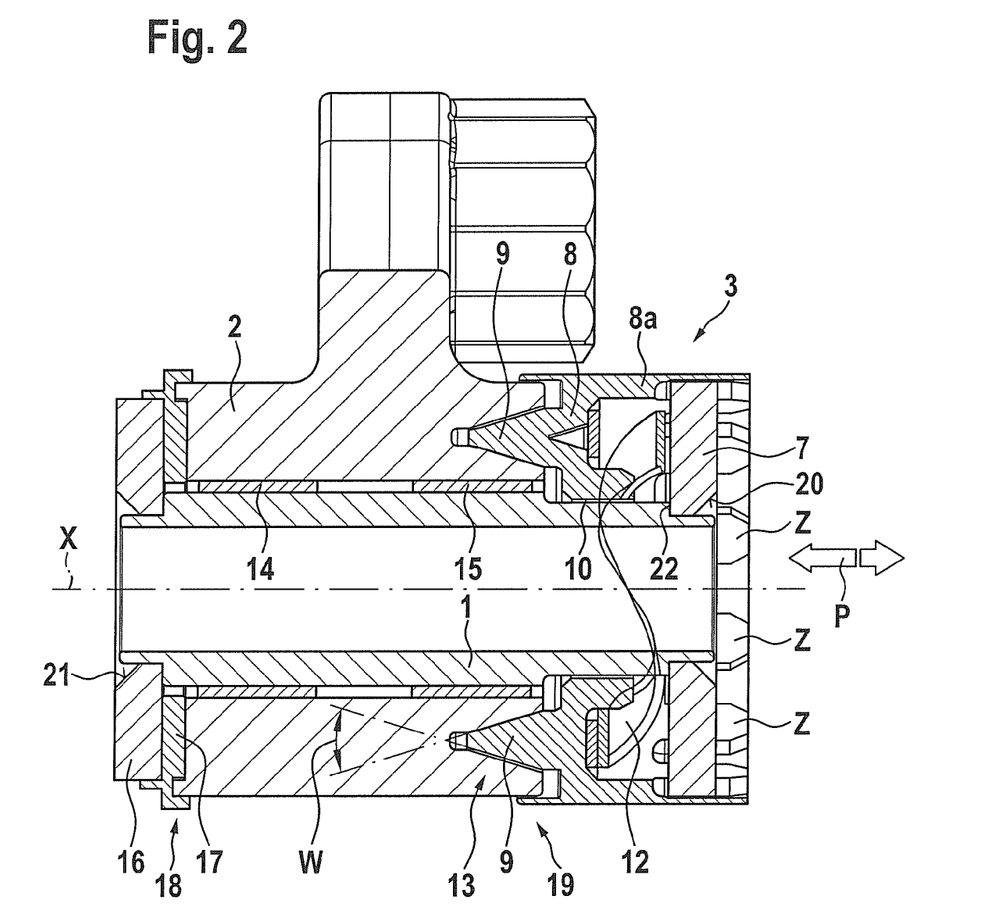
FIG. 2 is a detail representation elucidating the inner structure of the tensioning device of the invention according to a first preferred form of embodiment of the invention.

As can be seen in FIG. 2, the tensioning device of the invention is characterized in that the damping device 3 comprises an entraining device 7 and a guide member 8 engaging this entraining device 7. The guide member 8 carries the friction surface member 9 for producing the friction force. The guide member 8 is guided on the bearing peg 1 so as to be axially displaceable in direction of the axis of pivot X defined through the bearing peg 1 in the direction indicated by the arrow symbol P. The guide member 8 is further configured with a peripheral wall 8a that is engaged with the entraining device 7, such that the guide member 8 is likewise displaceable relative to the entraining device 7 in direction of the axis of pivot X. The peripheral wall 8a of the guide member 8 and the entraining device 7 are configured such that, through the meshing structures of these two components, a friction torque generated by the friction surface member 9 and acting on the guide member 8 can be transmitted and introduced into the bearing peg 1. To enable this introduction of the friction torque into the bearing peg 1, the entraining device 7 is coupled rotationally rigid to the bearing peg 1.

The guide member 8 in this example of embodiment is configured as a cup structure comprising a bottom opening 10 fringing the bearing peg. The bottom opening 10 forms a peripheral wall that is guided for axial displacement on an outer peripheral surface of the bearing peg 1. As will be explained in more detail in connection with FIG. 3, it is possible to configure this peripheral wall such that, alongside with this axial displacement of the guide member 8 relative to the bearing peg 1, a rotationally fixed coupling of these two components to each other is also achieved. This can be achieved in particular by configuring on the bearing peg 1 an engagement structure, for example in form of a knurling that has a peripheral profile that permits an axial displacement of the guide member 8 but prevents a rotation of the guide member 8 relative to bearing peg 1.

In the example of embodiment shown here, the friction surface member 9 constitutes an integral part of the cup structure forming the guide member 8. The entraining device 7 is configured as a disk element covering the end opening of the guide member 8. Alternatively to this variant of the entraining device 7 configured as a disk-shaped component, it is also possible to configure the entraining device 7 as a bell-shaped component that engages over the guide member 8 in the region of the outer periphery thereof, while being fixed, for the rest, similar to the illustrated disk-shaped entraining device 7, on the bearing peg 1.

In the example of embodiment shown here, the inner surface of the peripheral wall 8a of the guide member 8 is configured with an axial gearing Z that meshes with a complementary outer gearing of the entraining device 7. Through this outer gearing of the entraining device 7, an adequately smooth-running coupling of the guide member 8 to the entraining device 7 is achieved, so that the guide member 8 can be displaced in axial direction and any friction torques acting on the guide member 8 and the friction surface member 9, which the guide member 8 carries, can be effectively introduced into the bearing peg 1.

In this example of embodiment, the guide member 8 is configured such that, in the assembled state between an inner surface of the entraining device 7 and a bottom surface of the guide member 8 an annular space is left over in which a spring device 12 is lodged. The spring device 12 of this example of embodiment is configured as a relatively stiff ondular washer.

The spring device 12 serves to provide an axial force that urges the friction surface member 9 against a counter-friction surface 13. In the present example of embodiment, the counter-friction surface 13 is formed by circumferential groove with a V-shaped cross-section. The friction surface member 9 is configured as a tapered ring and seated in this circumferential groove. This circumferential groove which forms the counter-friction surface 13 is configured directly in a front end of the region of the pivoted arm 2 facing the guide member 8 and fringing the bearing peg 1. Alternatively, it is also possible to form the counter-friction surface 13 through a structure fixed on the pivoted arm 2, particularly an insert element disposed in the V-shaped groove illustrated in the figure. In case of the counter-friction surface 13 being formed by a substantially V-shaped circumferential groove, the inner walls of this circumferential groove define a wedge angle W approximately in the range of 45° to 60°. The choice of the wedge angle W and of the axial force generated by the spring device 12 is made with a view to the required braking torque to be generated by the damping device 3.

Through the configuration of the counter-friction surface as an inner surface of a V-shaped circumferential groove, it becomes possible to achieve relatively high braking torques with generation of moderate axial forces by the spring device 12. The spring device 12 is typically dimensioned to produce axial forces in the range of 500 to 4500 N. By the use of appropriate materials for making the guide member 8 and, in particular, with relatively large dimensions of the tensioning device, it is also possible to generate considerably higher axial forces with the spring device 12.

In the present example of embodiment, the pivoted arm 2 is mounted through interposition of two sliding bearing rings 14, 15 on the bearing peg 1.

The bearing peg 1 is anchored in a base plate 16. A disk 17, also functioning as a friction lining, is arranged in an intermediate space formed between a front end section of the pivoted arm 2 and the base plate 16. The disk 17 is made of a high strength plastic material and disposed loosely on the base plate 16, so that this disk 17 can slide both relative to end face defined by the pivoted arm 2 and relative to the front end of the base plate 16 facing the disk 17. The disk 17 comprises in the region of its outer periphery a covering profile 18 through which a sealing or at least a substantial covering of the displacement gap is achieved.

A peripheral profile 19 is also configured in the region of a peripheral section of the guide member 8 facing a front end of the pivoted arm 2. This profile 19 serves to substantially cover a gap region defined between the pivoted arm 2 and the guide member 8.

In the present example of embodiment, the bearing peg 1 is configured with a stepped tapering both in the region of its end section seated in the entraining device 7 and in the region of its end section seated in the base plate 16. The base plate 16 and the entraining device 7 are provided in the region of their outer sides facing away from each other with chamfered surfaces 20, 21. The respective end sections of the bearing peg 1 surrounded by these chamfered surfaces can be upset or bent over into these chamfered surfaces to secure the illustrated sub-assembly in the shown assembled state. This sub-assembly can be fixed on a machine, particularly an internal combustion engine, by clamping the base plate 16 thereon with help of a cap screw inserted through the inner bore of the bearing peg 1. Through this cap screw, a further securing of the entraining device 7 on the bearing peg 1 is achieved. The axial position of the entraining device 7 on the bearing peg 1 is guaranteed by an annular shoulder 22 configured on the bearing peg 1.

Figure 3:
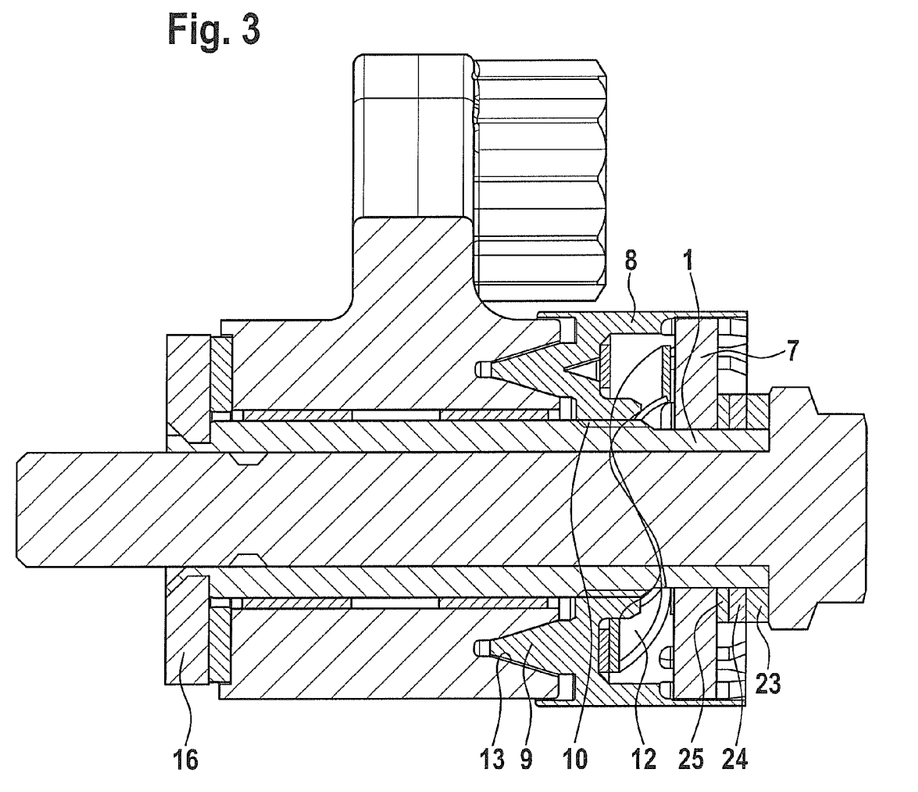
FIG. 3, is a further detail sectional representation elucidating a further form of embodiment of a damping device of the tensioning device of the invention.

The foregoing description applies analogously to a large extent also to the example of embodiment of the invention illustrated in FIG. 3. The major difference between this embodiment and the foregoing embodiment resides in the fact that, the guide member 8, in addition to the kinematic coupling to the bearing peg 1 realized through the entraining device 7, is also engaged directly with the outer peripheral wall of the bearing peg 1, rotationally fast but axially displaceable. This additional rotational coupling of the guide member 8 to the bearing peg 1 can be achieved by configuring complementary structures on the bearing peg 1 and on the inner peripheral surface of the bottom opening 10 surrounding the bearing peg 1, said complementary structures permitting only a displacement in direction of the central axis X of the bearing peg 1.

The aforesaid complementary structures can be formed in that a relatively sharp axial profile is configured only in the outer peripheral surface of the bearing peg 1, which profile cuts automatically, free of lash, into the peripheral wall of the bottom opening 10. Alternatively to this solution, it is also possible, already when forming the guide member 8, to configure the bottom opening 10 with a gearing or some other guide structure that can be brought to engage slidably with the outer peripheral wall of the bearing peg 1.

In the example of embodiment of FIG. 3, the bearing peg 1 is fixed in the base plate 16 by bending over the tapered end section of the bearing peg 1. Different to the embodiment of FIG. 2, the entraining device 7 configured as an entraining disk is arranged axially displaceable on the bearing peg 1, such that the axial position of the entraining device 7 can be defined through shims 23, 24, 25. Through the axial position of the entraining device 7, it is possible to set the pre-stress force with which the friction surface member 9 is urged against the counter-friction surface 13 as required.

In the inventive damping device for a belt tensioning device, a variable positioning of the entraining device 7 serving as a sealing disk enables the axial pressing force of the friction surface member 9 on the counter-friction surface 13 to be set. Through this positioning, component tolerances even in a very large range can be compensated and, in particular, a large range of forces is made available through the ondular washer. In the embodiment of FIG. 3, the variable positioning of the entraining device 7 or the setting of the pre-stress force of the spring device 12 is realized through said shims 23, 24 25 or, where appropriate, also through a different type of securing of the entraining device 7 in a corresponding axial position.

Insofar as the friction surface member 9 configured as a tapered ring is also guided torsion-proof on the bearing peg 1, it is possible to cut into the inner peripheral wall of the bottom opening 10, during the gradual pushing of the guide member 8 onto the bearing peg 1, the required structure or at least a coupling structure contributing to this type of guidance. By providing a meshing structure that is operative directly between the guide member 8 and the bearing peg 1 and realized by a penetration of an axial profile of the bearing peg into a wall of the bottom opening, concentricity errors between the components tapered ring, peg and even arm can be compensated. Another positive engagement for transmitting the friction torque is produced between the sealing disk and the tapered ring. Preferably, this positive engagement is also rendered free of lash by provision of a defined oversize. The gearing required for this may have a radial or a parallel configuration. The transmission of the friction torque from the entraining device 7 serving as a sealing disk to the bearing peg 1 is preferably effected through positive engagement or through force locking. Force locking can be realized, for example, through swaging of a peripheral section of the bearing peg 1 in the sealing disk. Positive engagement can be achieved through the profile shown in the sketch of FIG. 7.

Through the inventive configuration of the anti-rotation feature of the friction surface member 9, the friction between the tapered ring and the lever arm is such that the frictional heat is conducted substantially into the aluminum lever. In this way, advantageously, a danger of overheating of the friction surface member 9 is countered. Because the tapered ring material out of which the friction surface member 9 is made is preferably a plastic material and thus can be considered as an insulator, the entire heat is conducted into the pivoted arm 2 made of aluminum. The good thermal conductivity of aluminum and the large surface of the lever arm lead to a very good elimination of heat.

The damping (friction) required for the belt tensioner can be set in the region of the axis of the bearing peg 1 by an appropriate combination of the components and by the proper choice of the component parameters The component variants consist in using two friction disks, one friction disk and one tapered ring or two tapered rings. As to the component parameters, wedge angles in the range of 30° to 60° are used. Preferred are angles of 45° to 60°. The ondular washer forces can be in the range of 500 to about 4500 N. Preferably, these forces are situated in the range of 500 to about 1500 N. Through the large number of configuration alternatives offered by the inventive system, an optimal damping characteristic can be found for the system demands in individual cases.

The flat friction lining is preferably arranged on the engine side because this results only in a minimal shifting of the tension roller position due to possible wear (over the life duration).

On the basis of the inventive concept, it is advantageously possible to seal the friction surfaces of the tapered ring and the friction lining through labyrinth structures. A preferred material for making the sealing disk and the base plate is steel. Alternatively, these components may also be made of adequately strong materials, preferably aluminum. The entraining device 7 serving as a sealing disk can be made particularly as a laser-cut part or preferably as a (fine) punched part or even as a press-shaped component.

If the spring device is made as an ondular washer, this washer preferably has a characteristic curve which includes an elastic range as well as a plastic range. In the plastic range, the washer is displaced at a small increase of force. This behavior is used for compensating component tolerances. This results in a substantial facilitation of assembly of the system because the sealing disk can be pressed to a block or swaged.

Figure 4:
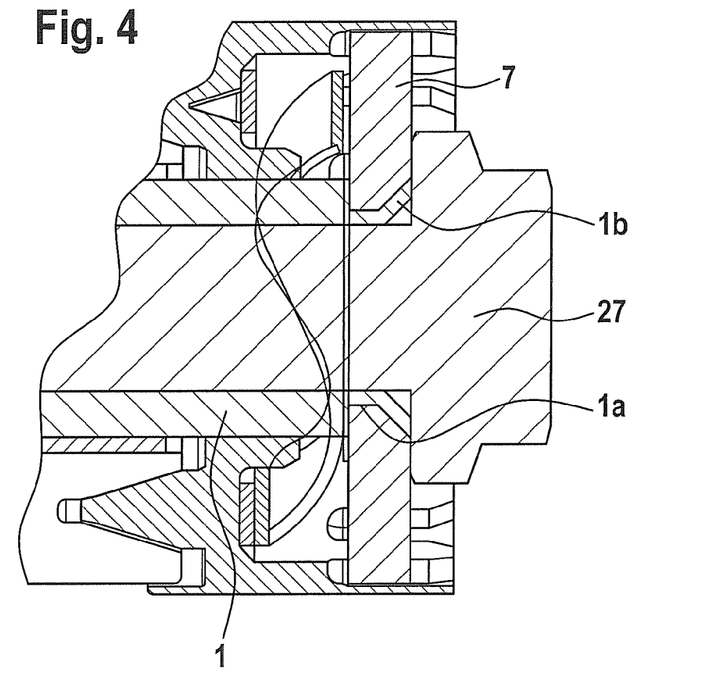
FIG. 4, is a detail representation illustrating the anchoring of an entraining device on the bearing peg.

FIG. 4 is a detail view showing how the entraining device 7 configured as a closing plate is seated on an annular step 1a on an end section of the bearing peg. The support shoulder defined by the annular step 1a determines the axial position of the entraining device 7 on the bearing peg 1. The entraining device 7 is locked on the bearing peg through a radially bent over edge of an end portion of the relatively thin annular shoulder wall 1b. The strength of this connection can be dimensioned such that the entire sub-assembly is adequately retained in the assembled state. The supporting force of the head of a fixing screw 27 additionally acting on the outer surface of the entraining device 7 in the installed state, further improves the fixation of the entraining device 7 on the bearing peg 1.

Figure 5:
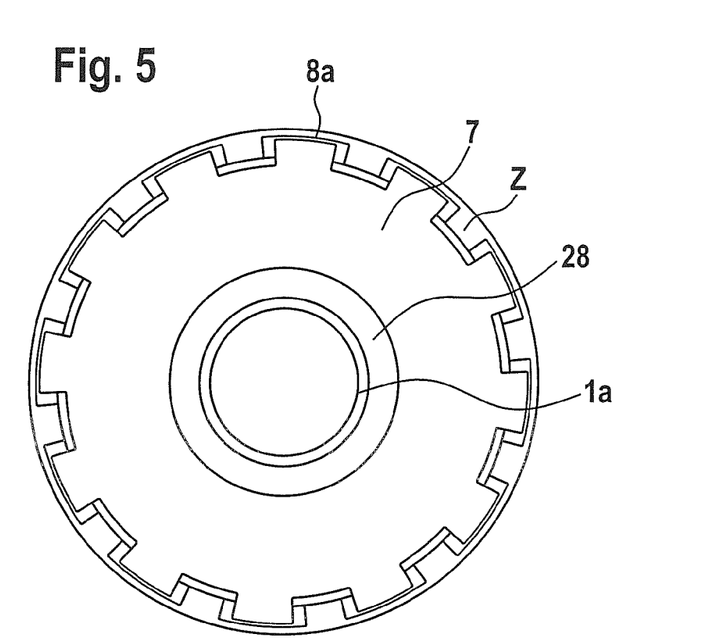
FIG. 5, is a sketch illustrating the engagement of the gearing configured on the peripheral wall of the guide member with the entraining device.

FIG. 5 shows, in a top view, the circumferential contour of the entraining device 7 of FIG. 4 as also the configuration of the gearing Z provided in the peripheral wall 8a of the guide member 8. The bore wall of the entraining device 7 surrounding the annular shoulder section 1a comprises a countersink 28 that receives the radially widened wall of the bearing peg 1.

Figure 6:
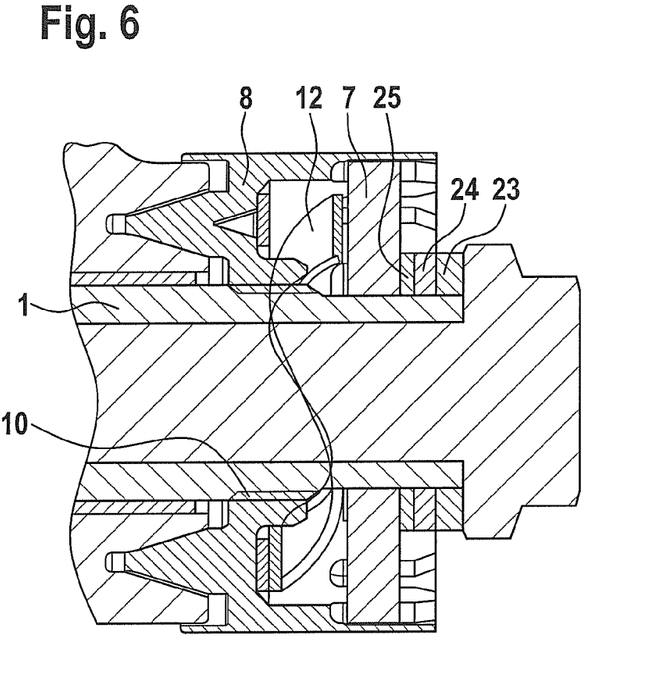
FIG. 6, is a detail representation illustrating the concept of a proper positioning of the entraining device for defining the required pressing force of the spring device.

As can be seen in FIG. 6, it is also possible to guide the entraining device configured a disk-shaped component for axial displacement on the end portion of the bearing peg that it surrounds. Engagement structures that will be described more closely below with reference to FIG. 7 can be configured in the region of a through-bore defined by the entraining device 7 and in the region of the adjoining outer peripheral wall of the bearing peg. The axial position of the entraining device 7 can be defined through shims 23, 24, 25. The prestress of the spring device 12 is set in accordance with the required axial position of the entraining device 7. It is possible to provide structures on the end portion of the bearing peg 1 that enable the shims 23, 24, 25 to be secured in the shown installed position even independently of the fixing screw that is shown in the figure in a simplified representation.

As can be seen further from the illustration in FIG. 6, it is also possible to configure engagement structures in the region of the opposing peripheral surfaces of the bearing peg 1 and the inner bore 10, which structures enable an axial guidance of the guide member 8 but prevent a relative rotation between these two components.

Figure 7:
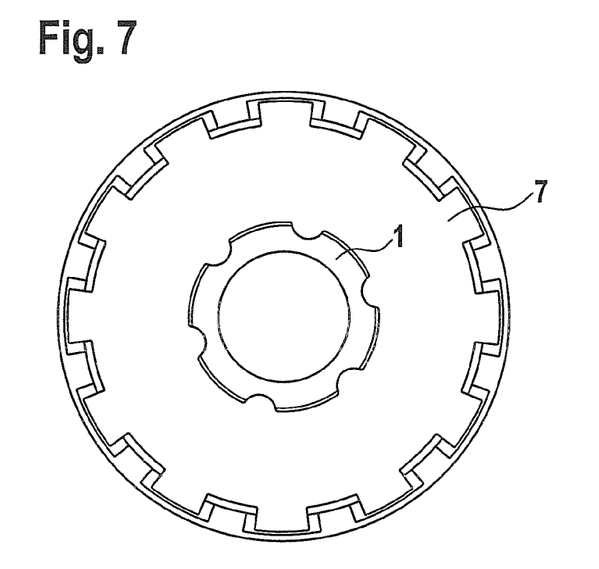
FIG. 7, is a schematic representation illustrating the engagement structure configured on an outer peripheral surface of the peg element and an inner peripheral surface of a bore of the entraining device.

FIG. 7 shows in a top view, the outer peripheral contour and the contour of the central through-opening of the entraining device 7. Through the gearing contour shown in the figure, this entraining device 7 is axially displaceably coupled both to the guide member 8 (FIG. 6) and to the end portion of the bearing peg 1.

Figure 8:
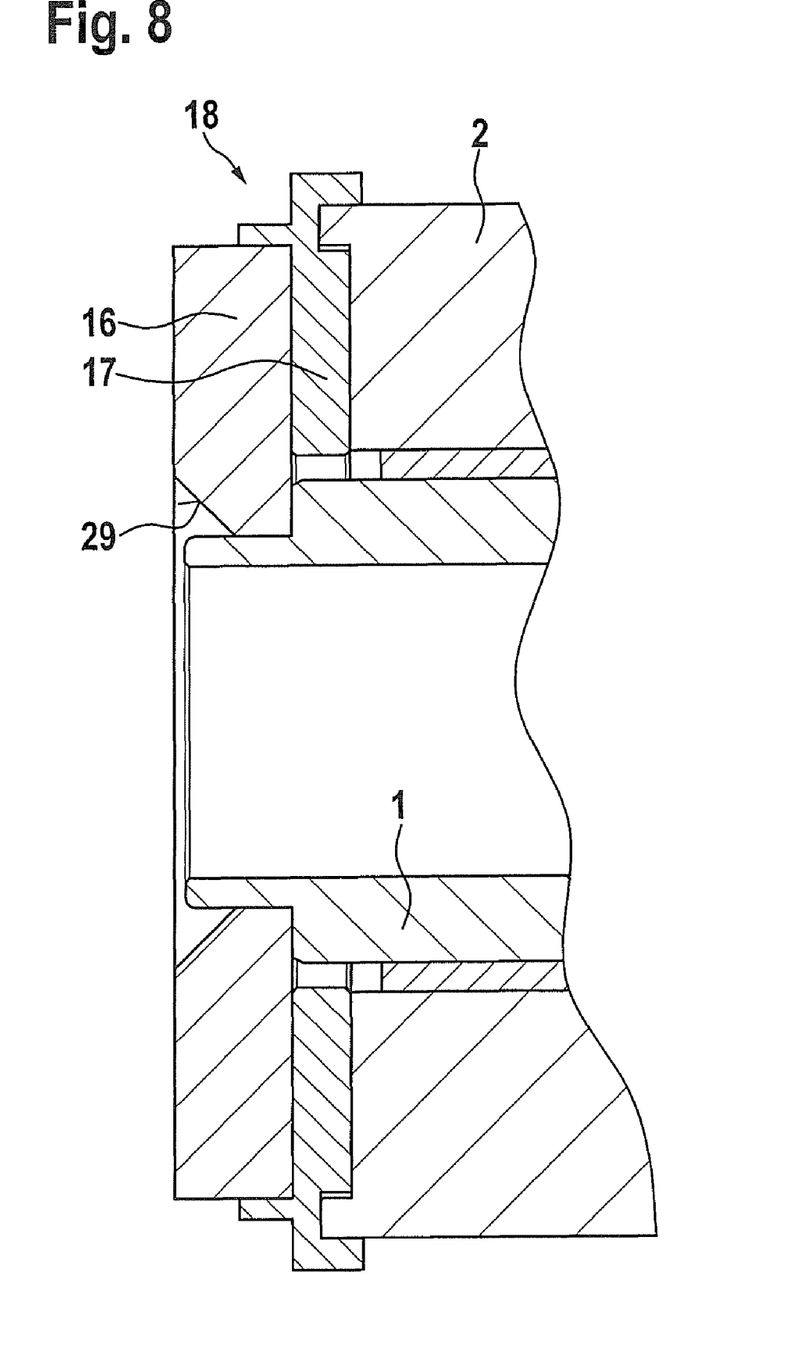
FIG. 8, is a detail representation illustrating the sealing concept for sealing a displacement gap directly by means of the friction element.

FIG. 8 is a detail representation of an axial end portion of the bearing peg 1 seated in the base plate 16. In the region of its end seated in the base plate 16, the bearing peg 1 comprises an annular shoulder that defines the seating depth of the bearing peg 1 in the base plate 16. On its side turned away from the disk 17, which likewise functions as a friction element, the base plate 16 comprises a chamfer 29 into which the adjoining end portion of the bearing peg 1 can be bent over.

The disk 17 likewise functioning as a friction element comprises in the region of its outer circumference, a profile 18 through which the displacement gaps left over between the base plate 16 and the end portion of the pivoted arm 2 seated on the disk 17 are covered.

Figure 9:
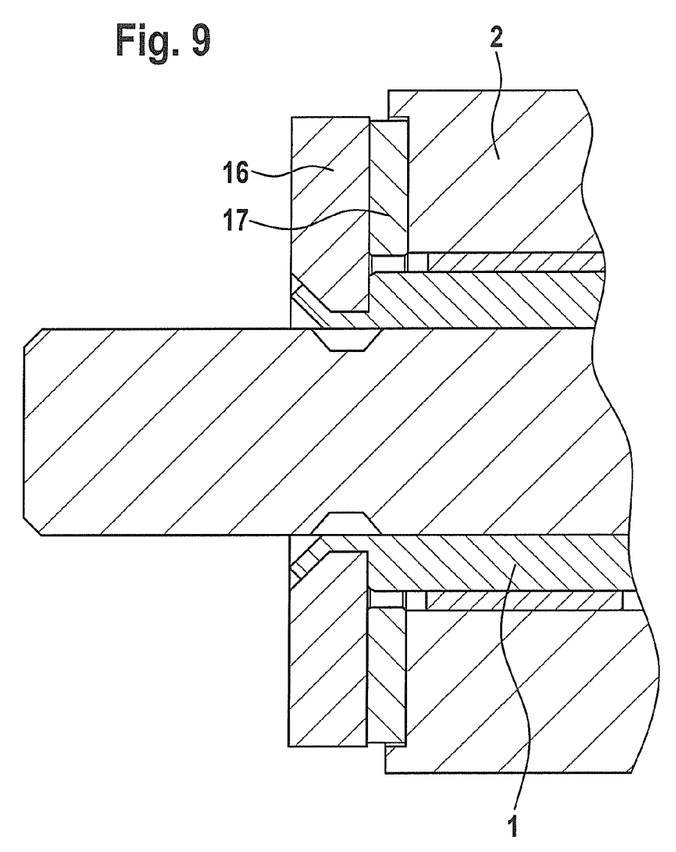
FIG. 9, is a detail representation illustrating the anchoring of the pivoting peg in the base plate.

In the form of a detail representation, FIG. 9 further elucidates how, through a radial widening, the front end of the bearing peg 1 facing the base plate 16 can be anchored in the base plate 16. Differently from the embodiment of FIG. 8, the embodiment of FIG. 9 does not provide a peripheral profile in the region of the outer circumference of the disk 17 likewise functioning as a friction element. The axial thickness of the disk 17 is chosen such that, even after a complete wear of this disk, no impermissibly large axial displacement of the pivoted arm 2 relative to the base plate 16 can take place. It is possible to configure the disk 17 functioning as a friction element in the form of a sandwich structure which guarantees an adequate wear resistance for a statistically to be expected operating life of the system. A further layer of this disk can function as an emergency layer that assures a certain degree of axial guidance of the pivoted arm 2 relative to the base plate 16 even after advanced wear, without occurrence of a direct impact of the concerned materials forming an unfavorable friction pair.

Figure 10:
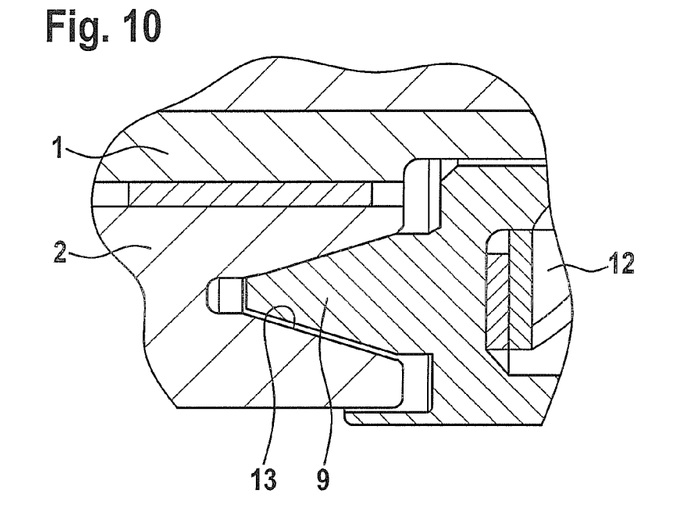
FIG. 10 is a detail representation illustrating the configuration of the friction member and of the circumferential groove provided for defining the counter-friction surface.
Figure 11:
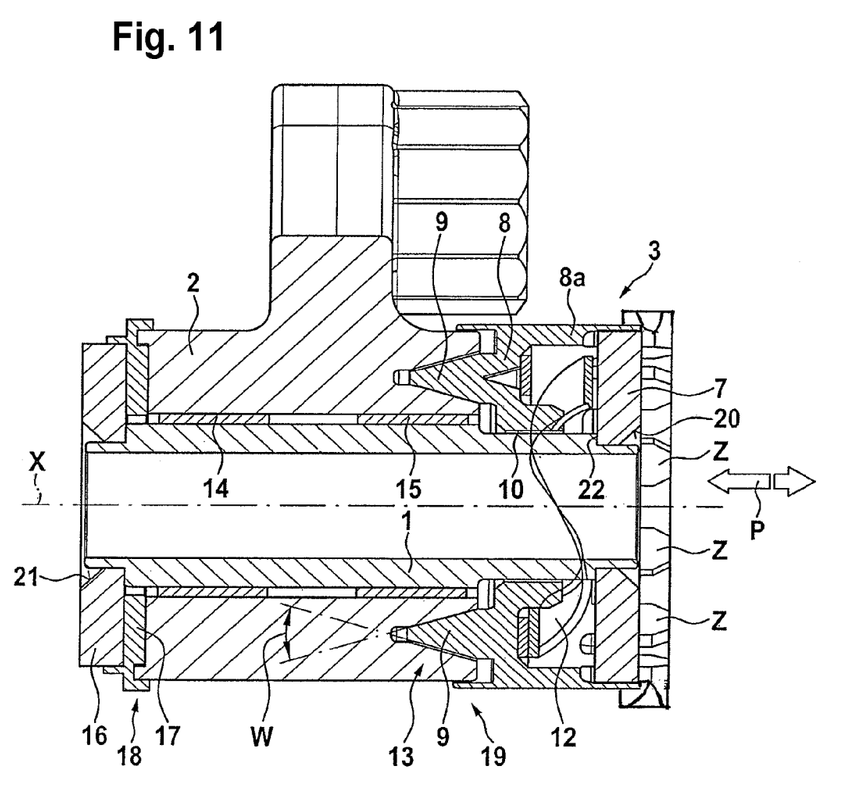
FIG. 11 is a detail representation elucidating the inner structure of the tensioning device of the invention illustrating the bell-shaped embodiment of the entraining device.

FIG. 10 shows in the form of a detail representation once more the V-shaped groove preferred for forming the counter-friction surface in the wall section of the pivoted arm fringing the bearing peg 1. In this V-shaped groove is seated the friction member 9 configured as a tapered ring. This friction member is pressed by the spring device 12 into the V-shaped groove with interposition of a shim.

The invention is not limited to the examples of embodiment described above. It is possible, in particular, to configure, in the region of the aforesaid disk that is arranged between the base plate 16 and the pivoted arm 2, a friction element configured as a tapered ring that is preferably coupled rotationally fast to the base plate 16 and extends, for the rest, in a V-shaped groove configured in the pivoted arm 2. It is further possible to configure the afore-described gearing provided between the peripheral wall 8a and the entraining device as a helical gearing, with which, depending on the direction of pivot of the friction member 9 relative to the entraining device 7, different axial pressing forces between the friction member 9 and the counter-friction surface 13 on which it is supported are produced.

List of Reference Numerals

1 Bearing peg
2 Pivoted arm
3 Damping device
4 Tensioning spring device
5 Support section
6 Tension roller
7 Entraining device
8 Guide member
9 Friction member
10 Bottom opening
11 not used
12 Spring device
13 Counter-friction surface
14 Bearing ring
15 Bearing ring
16 Base plate
17 Disk
18 Peripheral profile
19 Peripheral profile
20 Chamfer surface
21 Chamfer surface
22 Annular shoulder
23 Shim
24 Shim
25 Shim
26 not used
27 Fixing screw
28 Countersink
29 Chamfer
X Axis of pivot
Y Gearing

The invention claimed is:
1. A tensioning device comprising:
(i) a bearing peg,
(ii) a pivoted arm mounted for pivoting on the bearing peg, and
(iii) a damping device for generating a frictional force that damps the pivoting motion of the pivoted arm about an axis of pivot defined by the bearing peg, said damping device comprising a friction surface member forming a friction surface that is seated on a counter-friction surface and produces a frictional force,
wherein the damping device further comprises:
(a) an entraining device, and
(b) a guide member engaged with the entraining device and supporting the friction surface member, wherein the entraining device is coupled rotationally rigid to the bearing peg, and the guide member comprises a peripheral wall that is engaged with the entraining device to introduce the frictional force produced by the friction surface member into the bearing peg.

2. A tensioning device according to claim 1, wherein the guide member is configured as a cup structure comprising a bottom opening that fringes the bearing peg.

3. A tensioning device according to claim 2, wherein the bottom opening forms a peripheral wall that is engaged axially displaceable but rotationally fixed with an outer peripheral surface of the bearing peg.

4. A tensioning device according to claim 3, wherein the bearing peg comprises an engagement structure that is engaged with said peripheral wall of the bottom opening.

5. A tensioning device according to claim 4, wherein said engagement structure is configured as a knurling comprising a peripheral profile that permits axial displacement of the guide member but prevents rotation of the guide member relative to the bearing peg.

6. A tensioning device according to claim 2, wherein the entraining device is configured as a bell-shaped element that engages over the cup structure.

7. A tensioning device according to claim 1, wherein the friction surface member is an integral component of the guide member.

8. A tensioning device according to claim 1, wherein the entraining device is configured as a disk element.

9. A tensioning device according to claim 8, wherein an inner surface of the peripheral wall of the cup structure comprises an axial gearing that meshes with an outer gearing of the disk element.

10. A tensioning device according to claim 1, wherein a spring device urges the friction surface member against the counter-friction surface.

11. A tensioning device according to claim 10, wherein the spring device is an ondular washer.

12. A tensioning device according to claim 1, wherein the counter-friction surface is formed by an end surface section of the pivoted arm fringing the bearing peg.

13. A tensioning device according to claim 12, wherein the counter-friction surface is formed by a circumferential groove of V-shaped cross-section that is seated in said end surface section.

14. A tensioning device according to claim 13, wherein the friction surface member is configured as a tapered ring and seated in the circumferential groove.

15. A tensioning device according to claim 1, wherein the pivoted arm is mounted through a first sliding bearing ring and a second sliding bearing ring, and said first and second bearing rings are spaced from each other in the direction of the axis of pivot.

* * * * *

UNITED STATES PATENT AND TRADEMARK OFFICE
CERTIFICATE OF CORRECTION

PATENT NO.       : 8,187,128 B2
APPLICATION NO.  : 12/444207
DATED            : May 29, 2012
INVENTOR(S)      : Stefan Mack et al.

It is certified that error appears in the above-identified patent and that said Letters Patent is hereby corrected as shown below:

COLUMN 1:

Line 5, "2006," should read --2006;--.

COLUMN 2:

Line 28, "fringes" should read --surrounds--.

COLUMN 4:

Line 8, "DRAWING" should read --DRAWINGS--;
    Line 13, "detail" should read --detailed--;
    Line 16, "detail" should read --detailed--; and "FIG. 3," should read --FIG. 3--;
    Line 19, "detail" should read --detailed--; and "FIG. 4," should read --FIG. 4--;
    Line 21, "FIG. 5," should read --FIG. 5--;
    Line 24, "detail" should read --detailed--; and "FIG. 6," should read --FIG. 6--;
    Line 27, "FIG. 7," should read --FIG. 7--;
    Line 31, "detail" should read --detailed--; and "FIG. 8," should read --FIG. 8--;
    Line 34, "detail" should read --detailed--; and "FIG. 9," should read --FIG. 9--;
    Line 36, "detail" should read --detailed--;
    Line 39, "detail" should read --detailed--; and
    Line 43, "'DRAWING" should read --INVENTION--.

COLUMN 5:

Line 27, "fringing" should read --surrounding--.

COLUMN 6:

Line 10, "fringing" should read --surrounding--.

COLUMN 7:

Line 19, "free of" should read --without--;
    Line 27, "to" should read --from--; and
    Line 62, "free of" should read --without--.

Signed and Sealed this
Eleventh Day of September, 2012

David J. Kappos
*Director of the United States Patent and Trademark Office*

CERTIFICATE OF CORRECTION (continued)
U.S. Pat. No. 8,187,128 B2

COLUMN 8:

Line 51, "detail" should read --detailed--.

COLUMN 9:

Line 45, "detail" should read --detailed--; and
    Line 66, "fringing" should read --surrounding--.

COLUMN 11:

Line 8, "fringes" should read --surrounds--; and
    Lines 17-18, "is configured as a knurling comprising a" should read
        --comprises a knurled--.

COLUMN 12:

Line 13, "fringing" should read --surrounding--.